United States Patent
Zhou

(10) Patent No.: US 10,223,419 B2
(45) Date of Patent: Mar. 5, 2019

(54) SYSTEM AND METHOD FOR PREDICATE PUSHDOWN AND PARTITION PRUNING IN A DISTRIBUTED DATABASE

(71) Applicant: Futurewei Technologies, Inc., Plano, TX (US)

(72) Inventor: Yan Zhou, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 640 days.

(21) Appl. No.: 14/801,079

(22) Filed: Jul. 16, 2015

(65) Prior Publication Data

US 2017/0017684 A1   Jan. 19, 2017

(51) Int. Cl.
*G06F 17/30* (2006.01)

(52) U.S. Cl.
CPC .. *G06F 17/30486* (2013.01); *G06F 17/30321* (2013.01); *G06F 17/30489* (2013.01)

(58) Field of Classification Search
CPC .............. G06F 17/30321; G06F 17/30486
USPC ................................... 707/713; 700/3
See application file for complete search history.

(56) References Cited

U.S. PATENT DOCUMENTS

| | | | | |
|---|---|---|---|---|
| 5,924,088 A * | 7/1999 | Jakobsson | ......... | G06F 17/30327 707/716 |
| 2003/0187858 A1* | 10/2003 | Kirk | ......... | G06F 17/30463 707/999.1 |
| 2004/0103082 A1* | 5/2004 | Tran | ......... | G06F 17/30439 707/999.002 |
| 2007/0038597 A1* | 2/2007 | Sauermann | ....... | G06F 17/30454 707/999.003 |
| 2007/0219951 A1* | 9/2007 | Ahmed | ......... | G06F 17/30466 707/999.002 |
| 2012/0130982 A1 | 5/2012 | Kulkarni et al. | | |
| 2012/0278305 A1 | 11/2012 | Wei et al. | | |

FOREIGN PATENT DOCUMENTS

CN    102479255 A    5/2012

OTHER PUBLICATIONS

International Search Report and Written Opinion dated Oct. 13, 2016 in International Patent Application No. PCT/CN2016/089793, 11 pages.

* cited by examiner

*Primary Examiner* — Pierre M Vital
*Assistant Examiner* — Andrew N Ho
(74) *Attorney, Agent, or Firm* — Vierra Magen Marcus LLP

(57) ABSTRACT

The disclosure relates to technology for facilitating query optimization in a distributed data processing system to efficiently and precisely compute predicate push down and partition pruning A query operation is performed to locate data in the data processing system, thereby generating a predicate. Critical points of the predicate are determined based on data stored in the system, and critical point ranges are formed from a sorted sequence of each of the critical points. The predicate is evaluated using the critical points to qualify the critical point ranges, and a reduction is applied to the predicate during partial evaluation to produce reduced predicates on the qualified critical point ranges. The qualified critical point ranges are compared and matched to range partitions of data stored in the distributed system to qualify the range partitions. The reduced predicate is processed against the data in the qualified range partitions to obtain a query result.

20 Claims, 9 Drawing Sheets

| Two adjacent critical points and their categories: "a" followed by "b" | | Generated Ranges |
|---|---|---|
| a: I | b: I | (, a) [a, b) [b, ) |
| a: I | b: II | (, a) [a, b](b, ) |
| a: I | b: III | (, a)[a,b][b](b, ) |
| a: II | b: I | ( ,a](a,b)[b, ) |
| a: II | b: II | ( ,a](a, b](b, ) |
| a: II | b: III | (, a](a,b)[b](b, ) |
| a: III | b: I | (,a)[a](a,b)[b, ) |
| a: III | b: II | (,a)[a](a, b](b, ) |
| a: III | b: III | ( ,a)[a](a,b)[b](b, ) |

400

| Two adjacent critical points and their categories: "a" followed by "b" | | Generated Ranges |
|---|---|---|
| a: I | b: I | ( , a) [a, b) [b, ) |
| a: I | b: II | ( , a) [a, b] (b, ) |
| a: I | b: III | ( , a) [a, b) [b] (b, ) |
| a: II | b: I | ( , a] (a, b) [b, ) |
| a: II | b: II | ( , a] (a, b] (b, ) |
| a: III | b: I | ( , a) [a] (a, b) [b, ) |
| a: III | b: II | ( , a) [a] (a, b] (b, ) |
| a: III | b: III | ( , a) [a] (a, b) [b] (b, ) |

| PREDICATE CLASSIFICATION RULES |
|---|
| (A1, B1) AND ( A2, B2) = (A1 AND A2, B1 AND B2) |
| (A1, None) OR (A2, None) => (A1 OR A2, None) |
| (None, B1) OR (None, B2) => (None, B1 OR B2) |
| (A1, None) OR (None, B2) => (None, A1 OR B2) |
| (A1, B1) OR (A2, None) =>   (A1 OR A2, A2 OR B1) |
| (A1, B1) OR (A2, B2) => ((A1 OR A2), (A1 OR B2) AND (B1 OR A2) AND (B1 OR B2) |
| alternatively  => ((A1 OR A2), (A1 AND B1) OR (A2 AND B2)) |

SYSTEM AND METHOD FOR PREDICATE PUSHDOWN AND PARTITION PRUNING IN A DISTRIBUTED DATABASE

BACKGROUND

Databases are computerized information storage and retrieval systems in which very large sets of data may be stored. A relational database management system is a computer database management system (DBMS) that uses relational techniques for storing and retrieving data from the databases. The most common type of database is the relational database in which data is defined so that it could be organized and accessed in a number of different ways. Another type of database, referred to as a distributed database, is one that can be dispersed or replicated among different points in a network. In a distributed database, data sets are stored and processed in a distributed manner, where scale-out is a key feature in describing the capabilities to scale the processing and storage across servers in a cluster. The data sets are often maintained in a table with rows and columns, where rows organize instances of related data and columns group data having common attributes. In order to access the data from a location in the database, a user performs a query operation that is handled by the DMBS. When data sets are organized using attributes, queries may be facilitated in a more efficient manner. Additionally, techniques such as data pruning and partitioning and predicate push down may be applied to produce facilitation of efficient query results.

Most database management systems (DBMS) include a component called "query engine," or "query processing engine." The query engine is responsible for transforming the user query into a sequence of actions, called a "query plan," to answer the query. An "optimized" query plan uses various techniques to process the query more efficiently. For example, queries are often expressed in a query language such as a standard query language (SQL). The statements of the query language set out the search criteria of the user query in logical or "Boolean" expressions. The expressions of a query that determine the search criteria are called predicates. However, queries are often limited or narrow in scope and are typically directed to a small subset of the entire data set. For example, a "WHERE" clause of a query limits the interested data to those satisfying, or filtered by, the Boolean condition. The predicate (or predicate expression) consists of common and unique operators that employ constructs such as "AND," "OR," and "NOT." This way, query processing is an often time consuming and cost intensive operation since very large amounts of data may be processed and require retrieval from different sources throughout the database system.

BRIEF SUMMARY

In one embodiment, there is a method of optimizing a query in a data processing system, the method including determining, in response to the query, one or more critical points of a predicate based on one or more attributes of data stored in a storage system of the data processing system, and generating critical point ranges for each of the one or more critical points; evaluating the predicate to qualify the critical point ranges for a sorted sequence of critical points, and applying a reduction on the predicate based on the critical point ranges to qualify the critical point ranges and to generate a reduced predicate; comparing and matching the qualified critical point ranges generated from the predicate with sorted partition ranges of the data stored in the storage system of the data processing system to determine qualified data partitions; and processing the reduced predicate against the data in the qualified data partitions to obtain query results.

In another embodiment, there are one or more computer storage mediums having computer-executable instructions embodied thereon that, when executed, facilitate a method of optimizing a query in a data processing system including one or more client computer systems and one or more server systems communicatively coupled to a network, the method including pruning a predicate of the query including determining one or more critical points of the predicate, each of the one or more critical points associated with critical point ranges, evaluating the predicate to qualify the critical point ranges for a sorted sequence of critical points, reducing the predicate based on the qualified critical point ranges to generate a reduced predicate, and matching the qualified critical point ranges to partition ranges in the data processing system to determine qualified data partitions; and pushing down the reduced predicate on a qualified data-partition-by-data partition basis including classifying the reduced predicate into one of a push down sub-predicate and non-push down sub-predicate in response to the reduced predicate, and pushing down the push down sub-predicate to a storage system for processing, and executing the non-push down sub-predicate by the data processing system.

In still another embodiment, there is an apparatus to facilitate query optimization in a data processing system, the apparatus including a data source to store data for processing, and a processing engine configured to receive a query having a predicate for matching one or more partitions of data stored in the data source, determine one or more critical points of the predicate, and merge the critical points when two or more of the critical points are equivalent generate critical point ranges from the critical points for a sorted sequence of critical points, applying a reduction on the predicate based on critical point ranges having been qualified to generate a reduced predicate, matching the qualified critical point ranges generated from the predicate to sorted partition ranges of the data stored in the data source to determine qualified data partitions, and processing the reduced predicate against the data in the qualified data partitions to obtain query results such that costs associated with the optimization are no more than benefits resulting from the optimization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1:
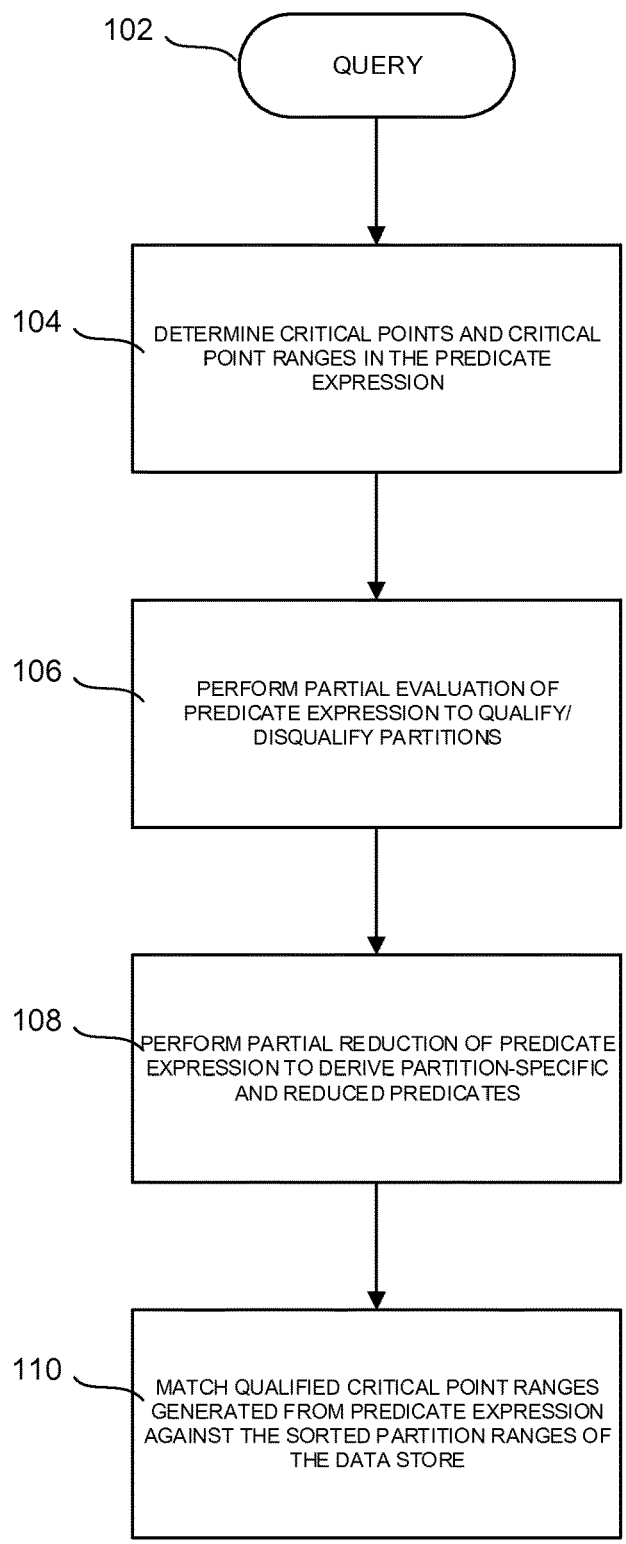
FIG. 1 is an exemplary flow diagram of a query processing method in a distributed data processing system.

The present disclosure, generally described, relates to technology for facilitating query optimization in a data processing system, such as a distributed data processing system, to efficiently and precisely compute predicate push down and partition pruning. A query operation is performed to locate data in the data processing system, thereby generating a predicate. In embodiments, critical points of the predicate are determined based on sorted data stored in the system, and critical point ranges are formed from the sorted list of the critical points. The predicate is evaluated on the critical points ranges to qualify or disqualify them, and a reduced predicate on a qualified critical point range may be generated. The qualified critical point ranges are compared and matched to range partitions of data stored in the distributed system to qualify the range partitions. The partition-specific reduced predicates are processed against the data in the qualified range partitions to obtain a query result.

In operation, the query may be supplied by a user of a client computer system of the data processing system such that a predicate from expression of the query is generated. As noted above, the query is typically transformed into the form of a query language, such as the standard query language (SQL), for processing by a data source capable of executing the query. Once the query is received by a processor in the system, the predicate is processed or executed to a reduced predicate and classified into a push down sub-predicate or non-push down sub-predicate. The non-push down sub-predicates are processed by a processing or querying engine at the DBMS, and the push down predicates are processed at the data store including the qualified range partition determined to store the requested data. Query results are returned to the querying client computer system upon completion of the processing.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The method of querying a processing system will now be explained with reference to the flow diagram of FIG. 1 and the block diagram of FIG. 2. At 102, a user may access a client computer system 210/212 using an input interface (not illustrated) to enter a query. Any conventional user interface (tablet, pc, keyboard, etc.) can be used to access the client computer system. The query is sent via network 215 to server system 220 for processing by the DBMS 230. The DBMS 230 and query engine 232 process the query to form a predicate, as described above. At 104 (FIG. 1), the predicate is processed to determine critical points (detailed below) based on the search criteria of the query. Critical points for an attribute in the predicate are defined as constants that are significant for data access based on the attribute with respect to a particular organization of the data (i.e., how the data is organized in a data storage system, such as a database). Essentially, critical points discretize a continuous domain by a particular predicate. For example, the predicate contains a finite number of variables that becomes a statement when specific values are substituted for the variables. The domain of a predicate variable is the set of all values that may be substituted in place of the variable. Critical points are described in more detail with reference to FIG. 3.

For the purpose of this description, the attributes (and associated restrictions) of a predicate are classified as "range" or "range-based" predicates if the restriction is some range or range of values. Range restricting operators include, for example, equal "=", greater ">", less "<", and their combinations. Logical operators which can be used with range restricting operators include, for example, AND, OR, and NOT.

At 106, after the critical points of the predicate are determined, the DBMS 230 and query engine 232 generate critical point ranges for each of the determined critical points. During implementation, the critical points are first sorted to be in a designated order such that a sequence of critical point ranges may be generated based on the sort order, a categorization, and necessary merge of, the critical points. Critical point range generation is discussed further below with reference to FIGS. 3 and 4.

Evaluation and reduction of the predicate is performed at 106 and 108 (FIG. 1). The evaluation and reduction is an operation by the DBMS 230 and query engine 232 of a predicate in which part of the predicate variables are bound values. The operation utilizes computational algebra to evaluate results even when some variables are "unknown." For example, a logical AND operation may return a value FALSE if a single operand in the operation is FALSE. For example, for an expression (k>3 AND t=2014), where k=2, the AND operation will return a FALSE value since "k" is not greater than 3, regardless of the value of "t." Thus, the result of FALSE is determined regardless of the value of the other operands of the logical AND operation.

Accordingly, the result of the evaluation (or partial evaluation) of the predicate results in a "reduced" predicate that will provide a Boolean value of TRUE, FALSE or another "reduced" predicate. The reduction (or partial reduction) is applied to the predicate on the critical point ranges generated from the critical points. Thus, critical point ranges may, or may not, be qualified by execution of the evaluation and reduction on the predicate by the DBMS 230 and query engine 232. Evaluation and reduction of the predicate is described in more detail below with reference to FIG. 6.

Figure 7:
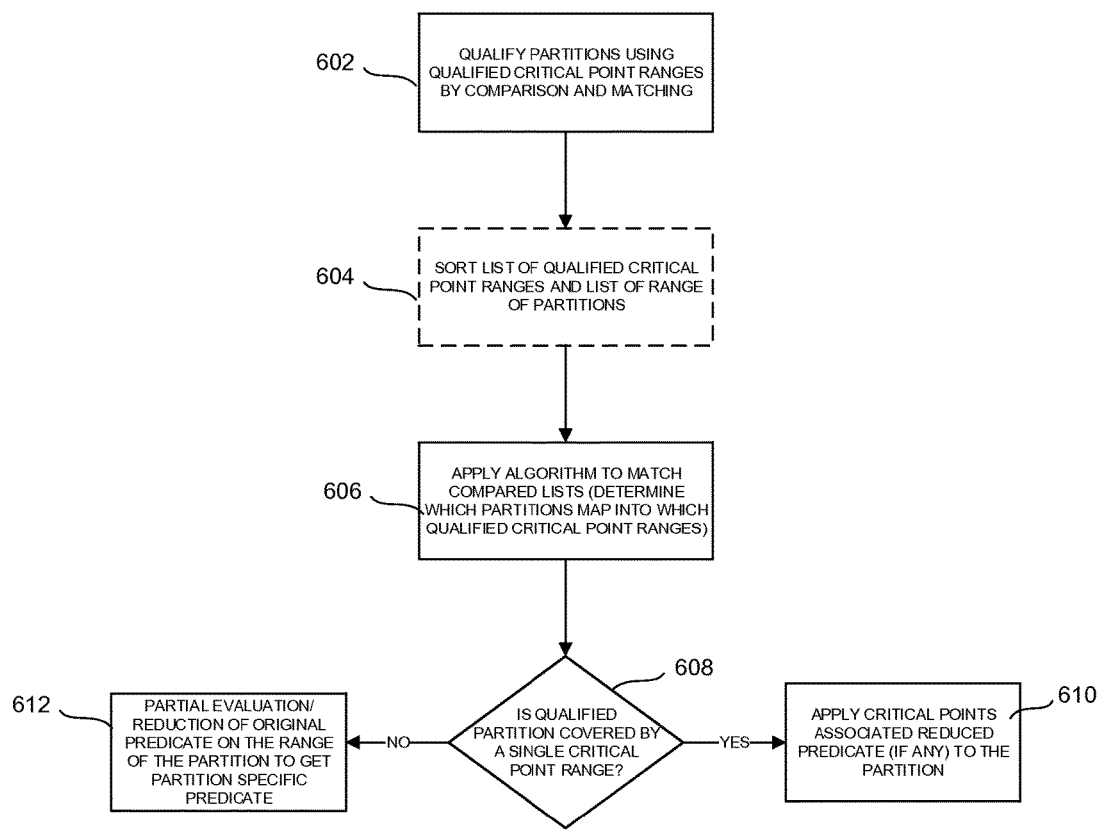
FIG. 7 is an exemplary flow diagram of a method of qualifying database partitions in accordance with the method of FIG. 1.

At 110, the DBMS 230 and query engine 232 compare and match (i.e., map) the qualified critical point ranges to range partitions of the data stored in the storage system 240, such as a database, to determine qualified range partitions. In one embodiment, the range partitions are organized, such as sorted. It is also appreciated that while the embodiments disclosed refer to range partitions, the disclosure is not limited thereto. Any type of partition may be applied as known by the skilled artisan. The reduced predicate is then processed against the data in the qualified range partitions to obtain query results, which are returned to the querying user at the client computer system 210/212. FIG. 7 describes the comparison and matching process below in more detail.

Figure 2:
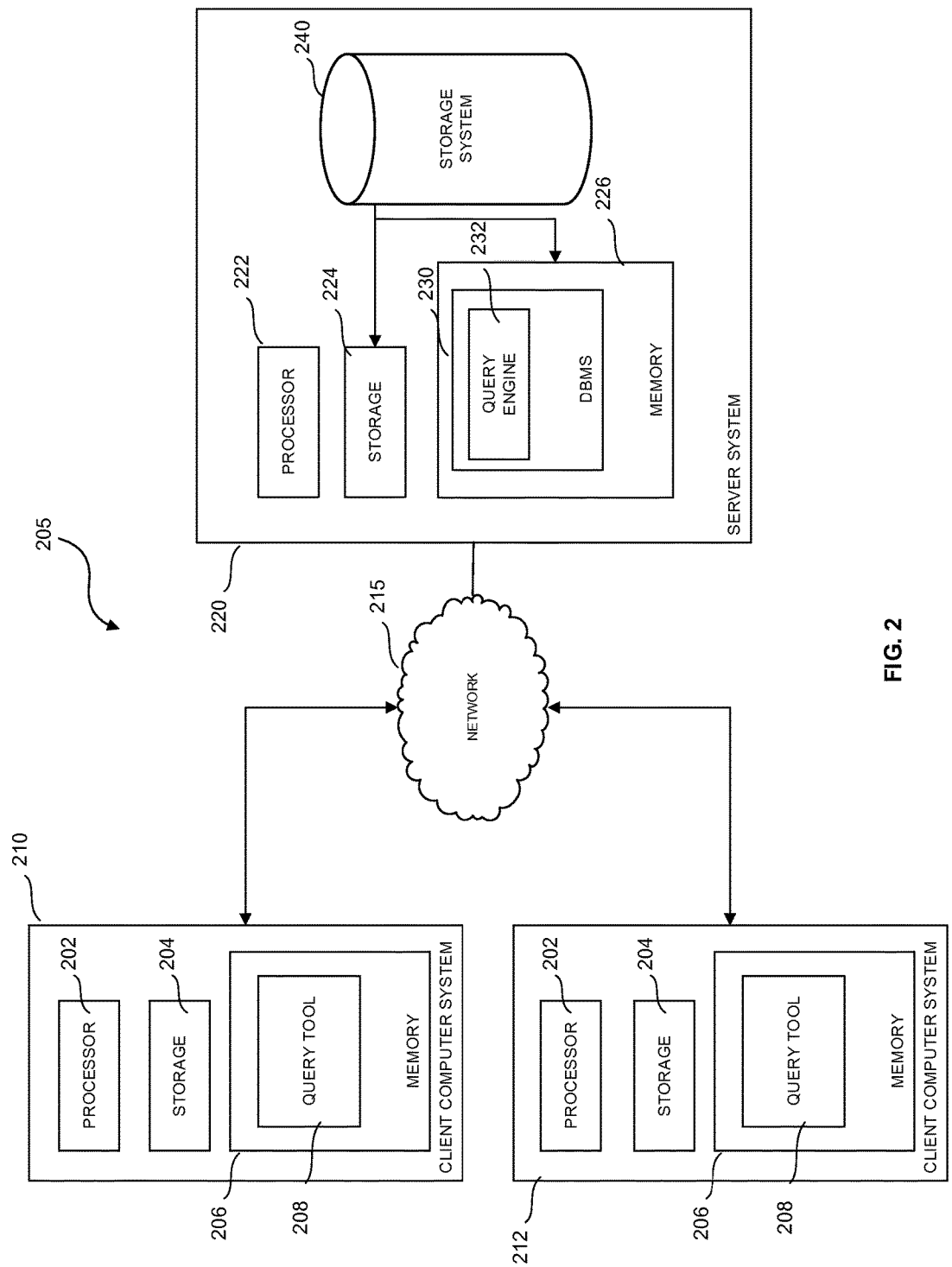
FIG. 2 is an exemplary diagram of a distributed computer system in which the query processing method of FIG. 1 may be implemented.

FIG. 2 is an exemplary diagram of a computer system in which the query processing method of FIG. 1 may be implemented. As shown, computing environment 205 includes two client computer systems 210 and 212, a network 215 and a distributed server system 220. The computer systems illustrated in environment 205 are included to be representative of existing computer systems, e.g., desktop computers, server computers, laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 2 are simplified to highlight aspects of the present embodiments and that computing systems and networks typically include a variety of additional elements not shown. For example, the system is not limited to two client computing systems or a single server, but may include any number of systems and servers.

Client computer systems 210 and 212 each include, for example, a processor 202, storage 204 and memory 206, typically connected by a bus (not shown). Processor 202 is, for example, a programmable logic device that performs the instructions and logic processing performed in executing user applications. Although illustrated as a single processor, the processor 202 is not so limited and may comprise multiple processors. The processor 202 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 202 may be configured to implement any of the schemes described herein, such as the processes illustrated in FIGS. 1, 3-4 and 6-8, using any one or combination of steps described in the embodiments. Moreover, the processor 202 may be implemented using hardware, software, or a combination of hardware and software.

Storage 204 may store application programs and data for use by client computer systems 210 and 212. Storage 204 includes hard-disk drives, flash memory devices, optical media and the like.

Server system 220 includes, for example, a processor 222, storage 224 and memory 226. Storage 224 also includes a storage system 240 (or database). Storage system 240, although depicted as part of the server system 220, may also be located outside of the server system 220 and communicatively coupled to the network 215. Moreover, it is appreciated that there may be more than one storage system (or database), and that the storage system may be any type of known database, database system, data stores, and the like.

Client computer systems 210 and 212 may also run a query tool 208, which is stored in memory 206. The memory 206 is illustrated as a single memory, although memory 206 may be implemented as a combination of read only memory (ROM), random access memory (RAM), or storage 204 (e.g., one or more disk drives or tape drives used for non-volatile storage of data). In one embodiment, query tool 208 may allow a user to compose a query, where query tool 208 is configured to automatically determine Boolean logic and generate a predicate, for example, as a Boolean expression. Additionally, query tool 208 may be configured to transmit a query over network 215 to server system 220 for execution by a database management system (DBMS) 230. In embodiments, the network 215 may comprise the Internet, though other networks including, but not limited to, a LAN or WAN are contemplated. Computer systems 210/212 and server system 220 may be connected to each other by direct wireless personal area networks (WPANs) and/or peer-to-peer connections in addition to, or instead of, their connection to network 215.

In one embodiment, the DBMS 230 is a software application configured to manipulate the information in storage system 240. For example, DBMS 230 may be configured to add, delete, modify, sort, display and search for specific information stored in storage system 240. In the depicted embodiment, DBMS 230 includes a query engine 232 which represents the instructions or routines included in DBMS 230 that evaluate logical operators and query conditions, according to a set of rules as described herein.

In one embodiment, the query tool 208 generates a query from user-specified query conditions. The queries generated by query tool 208 may be used to retrieve data from storage system 240. However, in one embodiment, query tool 208 does not require the user to specify any Boolean logical operators or to determine the order and precedence used by DBMS 230 and query engine 232 to evaluate and reduce the query conditions.

Figure 3:
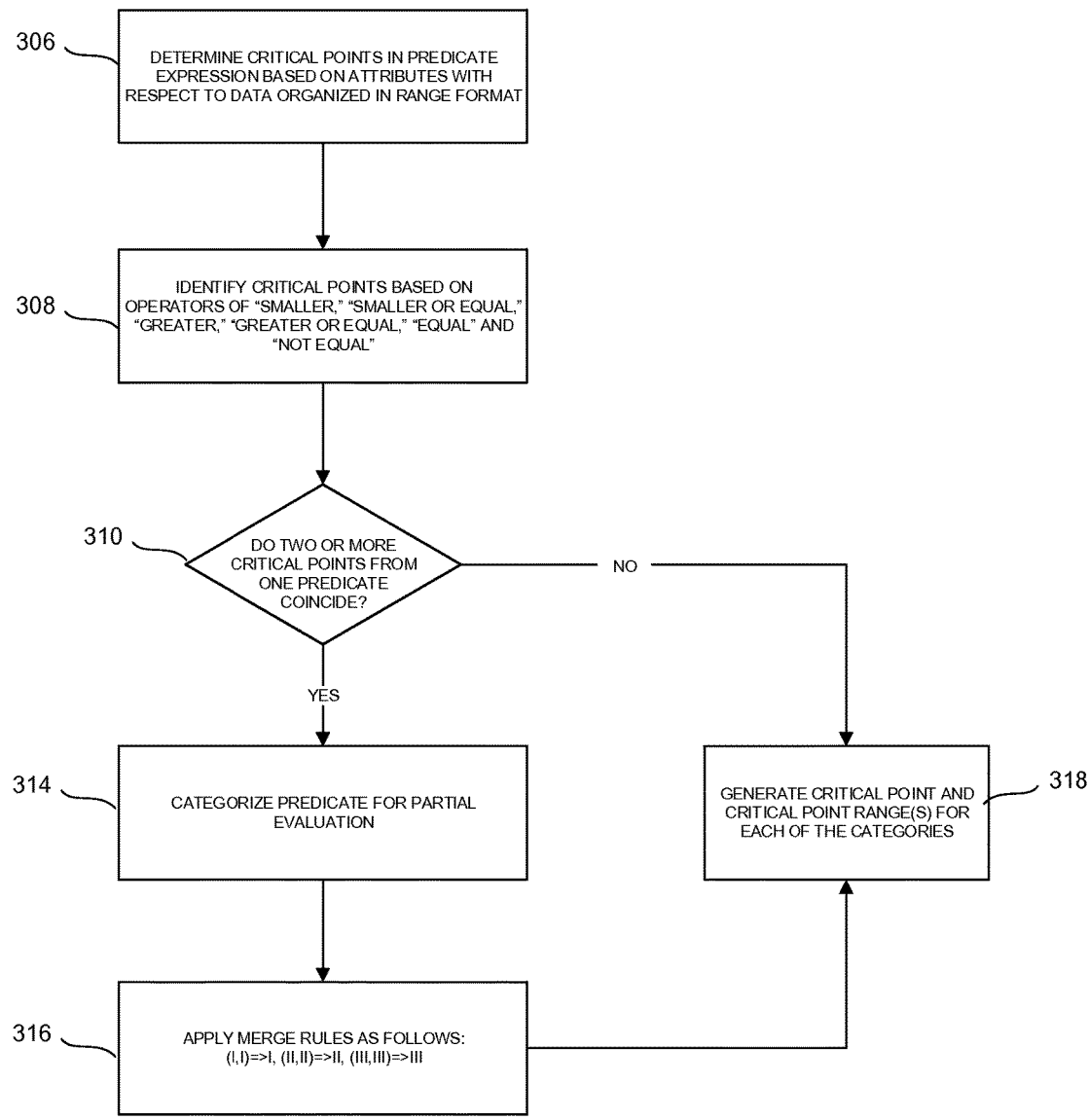
FIG. 3 is an exemplary flow diagram of determining critical points of a query in accordance with the method of FIG. 1.

FIG. 3 is an exemplary flow diagram of determining critical points of a query in accordance with the method of FIG. 1. Critical points of a predicate are determined at 306 by the DBMS 230 and query engine 232. The critical points are selected based on the contents of the logical operations of the query-based definitions. For example, if a definition of a query predicate is x>3 AND (OR) x<5, the critical points would be at x=3 and x=5.

Data stored in the storage system 240 that is organized in a range-based format (e.g., range-partitioned data sets), then the critical points are identified by DBMS 230 and query engine 232 based on range-based operators, such as: SMALLER, SMALLER OR EQUAL, GREATER, GREATER OR EQUAL, EQUAL and NOT EQUAL (at 308). Similar to the above example, since a logical NOT operator may change the predicate into a "mirror" image, the range-based operators may be grouped into three categories (one operator and a mirror image of the operator): category (I) "smaller" and "greater or equal", category (II) "greater" and "smaller or equal", and category (III) "equal" and "not equal." Thus, for a range-based predicate expression, each of the critical points potentially generates up to three categories (ranges) by discretizing the domains into different parts to then evaluate to determine which ranges qualify and which do not qualify. It is appreciated that while the disclosed embodiments relate to range partitioned data sets, the disclosure is not limited thereto. Other organized data sets, such as hash partitioned data sets, may also be implemented in accordance with the disclosed embodiments. As an example, for a predicate of "t=2014", the following three ranges are generated: (t<2014), (t=2014) and (t>2014).

At 310, the DBMS 230 and query engine 232 determine whether any two or more critical points from a single predicate coincide with one another. If two or more critical points do not coincide for the single predicate, then the process proceeds to 318 where a critical point range is generated for each critical point. For example, if a predicate is (t>2014 && t<2016), two different critical points exists, namely, 2014 and 2016, one for each condition in the predicate.

Otherwise, if two or more critical points coincide, the process proceeds to 314 and the predicate is categorized for evaluation and merge rules are applied at 316. The merge rules are defined as follows:

(I,I)=>I, (II,II)=>II, (III,III)=>III, where any combination of two different categories yields a predicate of category (III). For example, using a predicate of (k<1 OR t>2014) AND (k<3 OR t<2014) with a range partition of t, there are two critical points of t that are coincided at 2014, one of category I (<2014) and the other of category II (>2014).

In another example, using the same predicate and range partition of time as above, the merge rules are applied on the two coincident critical points at 2014 (where the two coincident critical points have different categories, i.e., categories I and II) and will generate a single critical point at 2014 of category III.

After categorization and application of the merge rules at 314 and 316, the process continues to 318. Critical point ranges are generated for each of the categories, as described with reference to FIG. 4, which is an exemplary flow diagram of generating a sequence of critical point ranges using range generation rules. The sequence of critical point ranges are generated when multiple (different) critical points exist.

At 320, the identified critical points are sorted by DBMS 230 and query engine 232, and then the sequence of critical point ranges may be generated based on the sorted critical points and the determined category. For example, if a predicate is (t>2014 && t<2016), two different critical points exist, namely, 2014 and 2016, one for each of the conditions in the predicate. Additionally, based on the critical points and conditions of the predicate, three critical point ranges exist: (t<=2014), (t>2014 AND <2016), and (t>=2016). In order to generate the critical point ranges from multiple different critical points, range generation rules are applied at 322.

Figure 4:
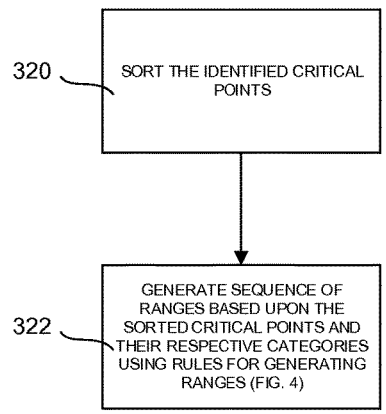
FIG. 4 is an exemplary flow diagram of generating a sequence of critical point ranges using range generation rules in accordance with the method of FIG. 1.
Figure 5:
FIG. 5 is an exemplary table of the critical point range generation rules applied in accordance with the method of FIG. 4.

The range generation rules are provided in table 400 of FIG. 5, which may be applied in accordance with the method of FIG. 4. The range generation rules are based on generating ranges between adjacent critical points and respective categories. Adjacency in this context refers to two critical points that are sequentially next to one another or ordered nearest to one another. For instance, if three critical points exist for a predicate (e.g., critical points 2014, 2015 and 2016), then critical point 2014 is adjacent to critical point 2015, which is adjacent to critical point 2016. The range generation rules may then be applied to the critical points and their categories by the DBMS 230 and query engine 232. If we label two of the adjacent critical points as follows: a=2014 and b=2015, and both (a) and (b) are classified as category II, application of the range generation rules in table 400 results in (a:II, b:II)=(,a](a,b](b,). In the table 400, parenthesis denote an open end; square brackets denote closed ends; a missing value denotes an open boundary. For instance, (2014, 2015] denotes a range of anything bigger than 2014 and smaller than or equal to 2015; while (, 2015) denotes a range of anything smaller than 2015.

Figure 6:
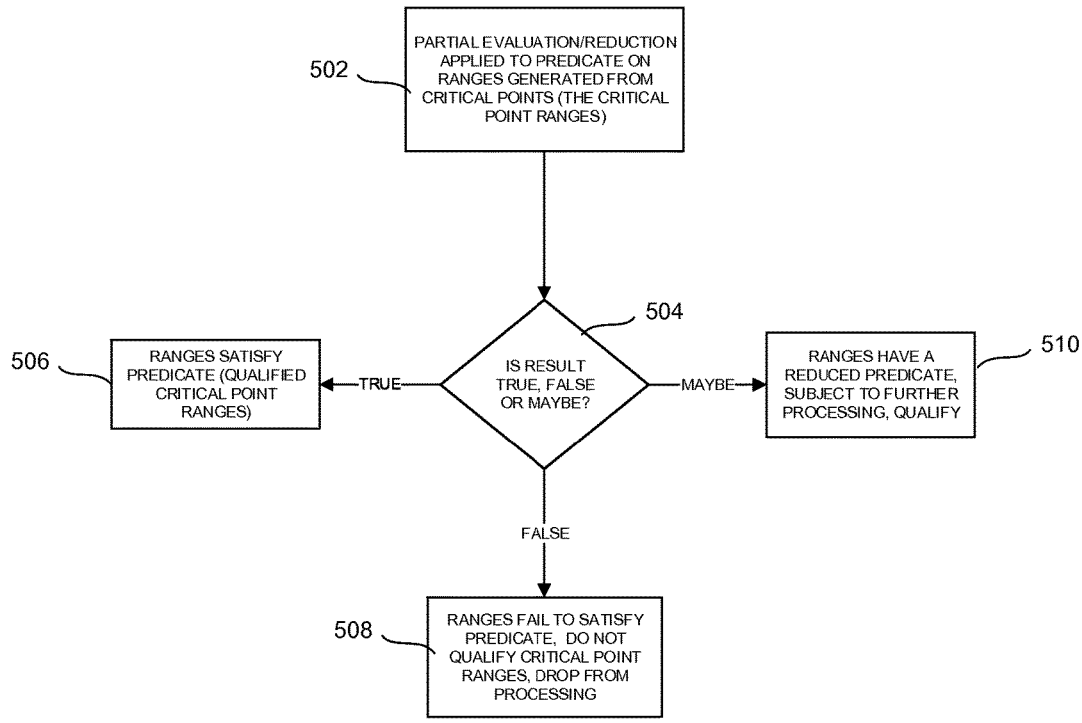
FIG. 6 is an exemplary flow diagram of a method of partial evaluation and reduced predicate generation in accordance with the method of FIG. 1.

FIG. 6 is an exemplary flow diagram of a method of partially evaluating and reducing a predicate in accordance with the method of FIG. 1. At 502, the predicate is evaluated and reduced by the DBMS 230 and query engine 232 based on the generated critical point ranges, as described above. Partial evaluation and reduction of the predicate on the critical point ranges may result in a condition of TRUE, FALSE or reduced predicate. When the reduced predicate is evaluated with all variables bound, as explained above, a Boolean value of TRUE or FALSE will result.

In one embodiment, the evaluation and reduction may be accomplished by the DBMS 230 and query engine 232, for example, by determining whether the predicate is "empty" or "not empty" and, when empty, propagating the condition up nodes of an expression tree representative of the predicate to a definitive TRUE or FALSE. As known, a binary expression tree is a specific application of a binary tree to evaluate expressions. Two common types of expressions that a binary expression tree can represent are algebraic and Boolean. These trees can represent expressions that contain both unary and binary operators. Moreover, the expression tree may be stored in memory, such as memory 226, for later evaluation.

When the DBMS 230 and query engine 232 return a result of TRUE based on the partial evaluation and reduction (at 504), the critical point ranges satisfy the predicate (at 506) and no further evaluation or reduction is required (regardless of any unbound variables). If the DBMS 230 and query engine 232 return a result of FALSE based on the evaluation and reduction (at 504), the critical point ranges do not satisfy the predicate and the range is dropped from further processing (at 508). Otherwise, if the evaluation and reduction returns an (reduced) predicate, the reduced predicate will be subject to additional processing at 510 in accordance with the methods described herein (e.g., to further reduce the "reduced" predicate, or to fully evaluate if and when all variables are bound).

An example of evaluating and reducing a predicate according to the method of FIG. 6 follows. If the query 102 (FIG. 1) includes a predicate of (k>3 OR v<4), where "k" has a bound value of 3, the predicate will reduce to (v<4). If "k" has a bound value of 4, the predicate will reduce to the condition TRUE. The evaluation and reduction can also be applied to variables bound to values other than single values. For instance, for a range predicate (a predicate in which the conditions are range-based), variables may be bound to ranges. Thus, for a predicate of (k>3), the DBMS 230 and query engine 232 will evaluate and reduce the predicate to a condition of TRUE when "k" is bound to the range of (4,). When "k" is bound to the range of (,4), the predicate will be evaluated and reduced to an reduced predicate of v<4.

FIG. 7 is an exemplary flow diagram of a method of qualifying database partitions in accordance with the method of FIG. 1. The qualified critical point ranges may be used to qualify the range partitions by comparing and matching (i.e., mapping). In particular, the qualified critical point ranges determined using the method in accordance with FIG. 6 will be used to qualify the range partitions at 602 (and "prune" off or drop partitions that do not match the qualified critical point ranges). Optionally, at 604, the qualified critical point ranges and range partitions are sorted. In one embodiment, the qualified critical point ranges and range partitions are previously sorted.

If the sequence of range partitions are sorted, for example based on a range-based attribute, the qualification of the range partitions is performed by the DBMS 230 and query engine 232 by comparing and matching the qualified (and sorted) critical point ranges to the (sorted) range partitions. That is, the DBMS 230 and query engine 232 determine which of the range partitions map into which of the qualified critical point ranges, thereby qualifying the range partitions (hereinafter, qualified partitions). This determination may be implemented using any known algorithm capable of comparing and matching the critical point ranges to the range partitions.

In one embodiment, at 608, the DBMS 230 and query engine 232 determine if a qualified partition is covered by a single, qualified critical point range. If the qualified partition is covered by a single, qualified point range, then the reduced predicate of the single, qualified critical point range will be executed for the qualified partition at 610. If the qualified partition is covered by multiple, qualified critical point ranges, a "reduced" predicate for the qualified partition may be obtained. That is, the DBMS 230 and query engine 232 then apply a reduction on the predicate of the original query on the range of the qualified partition to generate a reduced "partition specific" predicate, at 612.

Figure 8:
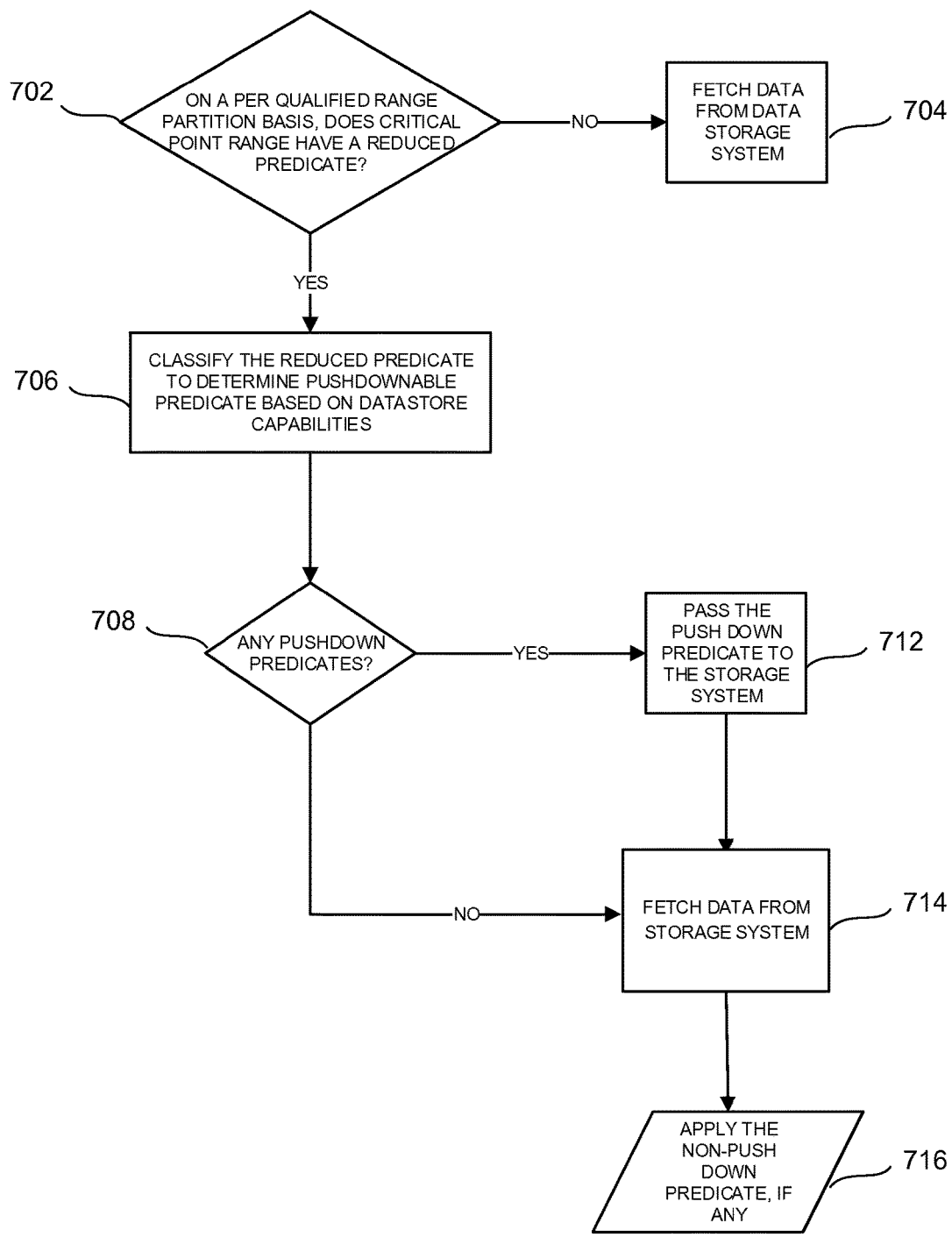
FIG. 8 is an exemplary flow diagram of a method of classifying a predicate in accordance with the method of FIG. 1.

FIG. 8 is an exemplary flow diagram of a method of classifying a predicate in accordance with the method of FIG. 1. After the qualified partitions have been identified and the reduced partition specific predicate has been generated, the DBMS 230 and query engine 232 evaluate the reduced specific predicate on a qualified range partition basis to determine whether a critical point range has a corresponding reduced predicate at 702. If the condition is determined to be TRUE, then the process proceeds to 704 where a data fetch request will be directed to the storage device. A query result may then be returned to the client computer system 210/212. Otherwise, the process proceeds to 706 to classify the reduced partition specific predicate into a push down sub-predicate or a non-push down sub-predicate based on the capabilities of the data store.

For a reduced partition specific predicate classified as a push down sub-predicate (708), the sub-predicate can be pushed down to the storage system having the partition for execution at 712. The process then proceeds to 714 where data is fetched from the storage system 240. A reduced partition specific predicate is classified as a push down sub-predicate since the expressions in the sub-predicate may be executed internally (or locally) at the data store. When no pushdown predicates exist as determined at 708, the process proceeds directly to 714 where data is fetched from the storage system 240. A reduced partition specific predicate is classified as a non-push down sub-predicate when the expressions in the sub-predicate may not be handled or executed by the data store (for example, the expressions being too complex).

The two classified sub-predicates, after logically ANDed (at 714), will form a "combined" predicate which is logically equivalent to the partition-specific, reduced predicate. Specifically, the predicate is formed by logically ANDing the two classes of (executed) sub-predicates. The formed predicate is represented by a 2-tuple expression of (A, B), where A denotes the push down sub-predicate and B denotes the non-push down sub-predicate. It is appreciated, however, that the classification is subject to the specific storage system capabilities (e.g., the capabilities of the storage system to execute the predicate locally). That is, typical storage technologies support some but not all types of predicates. For instance, index-based databases support range-based predicate pushdown, while many NOSQL key-value storage system support pushdowns of more complex combinations of predicates. At 716, the non-push down predicate is then applied, if any.

Figure 9:
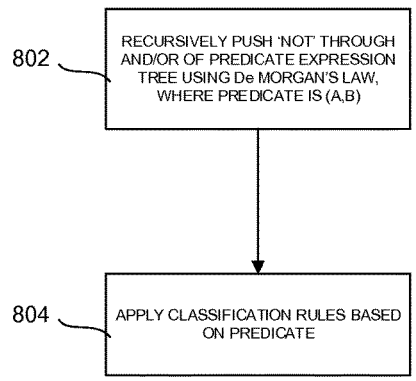
FIG. 9 is an exemplary flow diagram of a method of applying classification rules in accordance with the method of FIGS. 1 and 8.

FIG. 9 is an exemplary flow diagram of a method of applying post classification rules in accordance with the method of FIGS. 1 and 8. At 802, a logical NOT operator is pushed through the logical AND operator of an expression tree representative of the formed (A, B) predicate by application of De Morgan's Law. Similarly, the logical NOT operator is recursively pushed through the logical OR operator of an expression tree representative of the formed (A, B) predicate by application of De Morgan's Law. Essentially, the application of De Morgan's Law on the formed (A, B) predicate eliminates the NOT logical operators from the predicate by inverting logical comparison operators, and reverses logical AND and OR operators where necessary. For example, NOT (k=3 AND t>2014) becomes NOT (k=3) OR NOT (t>2014),
NOT (k=3 OR t=2014) becomes NOT (k=3) AND NOT (t=2014)),
NOT (k=3) becomes (k<3) OR (k>3), and NOT (t>2014) becomes (t≥2014), etc.

After completion of recursively pushing the NOT operator through the expression tree, rules of post classification for the logical AND operator (shaded row) and for the logical OR operator (non-shaded rows) are applied at 804.

Figure 10:
FIG. 10 is an exemplary table of the post classification rules in accordance with the method of FIG. 9.

The rules of classification are listed in table 900 of FIG. 10. As an example, the first row of the classification rules relates to the logical AND operator. The rule: (A1, B1) AND (A2, B2)=(A1 AND A2, B1 and B2), where A1 and A2 are push down sub-predicates and B1 and B2 are non-push down sub-predicates. Applying the rule, if any of the sub-predicates A1, A2, B1 or B2 is empty (no value), then the empty sub-predicate is evaluated as a TRUE condition. For instance, if A2 is empty, then (A1 AND A2) is reduced to A1. Thus, the AND operation reduces the expression. Although more complex, the classification rules related to the OR operator may be similarly applied.

As a result of the process and methods described herein, the system may efficiently and precisely generate "pruned" partitions, partition-specific push down predicates on range-partitioned data sets from arbitrarily complex logic predicates in a query. In particular, partition pruning utilizes the range partitioned data sets, while the predicate push down utilizes the underlying storage device that is "intelligent" and has a built-in capability of record filtering. Moreover, the predicates are evaluated for reduced partition specific predicates that are custom to the partition and typically simpler than the predicate of the original query. Moreover, costs associated with classified predicates do not typically exceed costs of the predicate of the original query (with the exception of the "alternative" OR rule in the last row of table 900). Additionally, critical point discovery, critical range generation, partial reduction on critical ranges all have linear complexity of the size of the original predicate, and the partition pruning has the complexity of O(log(partition size)+log(predicate size)+(pruned partition size)). Similarly, the classification has the complexity of O((predicate size)+(size of disjunction of conjunction of sub-predicates)$^{0, 1.33 \text{ or } 2.}$).

Certain embodiments may provide one or more technical advantages. A technical advantage of one embodiment may be critical points are derived from conditions in the predicate expression to generate a range of critical points that may qualify data partitions. Another technical advantage of one embodiment may be the evaluation and reduction of predicates to derive a fine-targeted partition-specific expression that allows for efficient in-store and in-engine filtering. Yet another technical advantage of one embodiment may be the matching of ranges generated from predicates against the physical partition ranges of the storage system. Still another embodiment may be the use of rules for merging classified, coincident, critical point ranges and rules for post classification of predicates.

Figure 11:
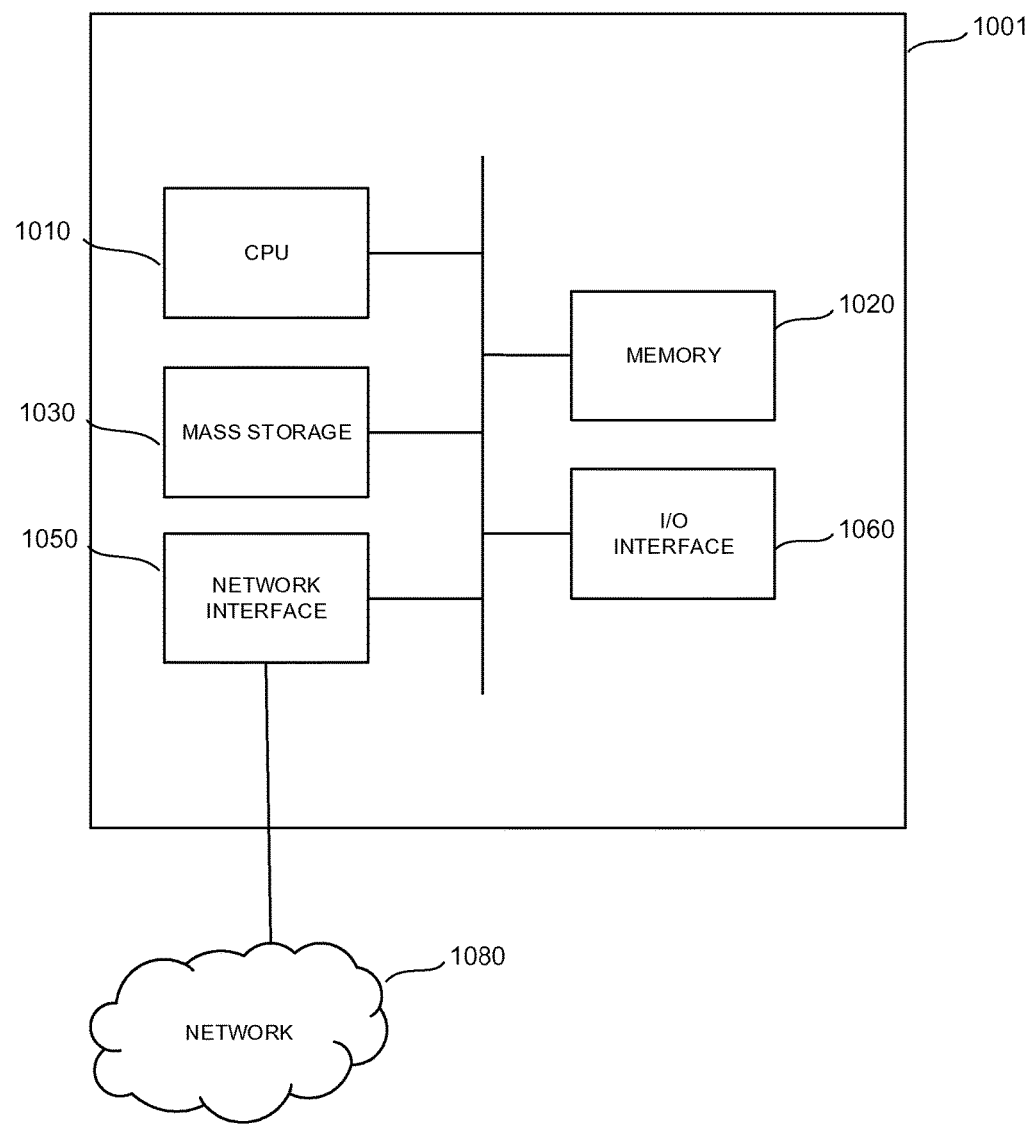
FIG. 11 is a block diagram of a network system that can be used to implement various embodiments.

FIG. 11 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1001 equipped with one or more input/output devices, such as network interfaces, storage interfaces, and the like. The processing unit 1001 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of optimizing a query in a data processing system, the method comprising:
   determining, in response to the query, one or more critical points of a predicate based on one or more attributes of data stored in a storage system of the data processing system, and generating critical point ranges for each of the one or more critical points;
   identifying the one or more critical points based on at least one logical operator and determining whether two or more of the critical points of the predicate are equivalent, wherein the one or more critical points are adjacent, and when the two or more critical points fail to be equivalent, generating the critical point ranges for each of the two or more critical points, and when the two or more critical points are equivalent, categorizing the two or more critical points into one of three categories and generating critical point ranges between the one or more critical points for each of the three categories, merging the categorized two or more critical points based on a set of merge rules, and generating the critical point ranges for each of the three categories after the merging;

evaluating the predicate to qualify the critical point ranges for a sorted sequence of critical points, and applying a reduction on the predicate based on the critical point ranges to qualify the critical point ranges and to generate a reduced predicate;

comparing the qualified critical point ranges generated from the predicate with sorted partition ranges of the data stored in the storage system of the data processing system, and matching the qualified critical point ranges to determine qualified-data partitions; and processing the reduced predicate against the data in the qualified data partitions to obtain query results.

2. The method according to claim 1, wherein the at least one logical operator comprises one of SMALLER, SMALLER OR EQUAL, GREATER, GREATER OR EQUAL and NOT EQUAL.

3. The method according to claim 2, wherein the three categories respectively include the operators: SMALLER or GREATER OR EQUAL, GREATER or SMALLER OR EQUAL, and EQUAL or NOT EQUAL; and applying the set of merge rules to the categorized equivalent critical points to generate the critical point ranges for each of the categories.

4. The method according to claim 3, further comprising sorting the identified one or more critical points; and applying critical point range generation rules to the generated critical points based on a sorted sequence of one or more critical points and one or more corresponding categories.

5. The method according to claim 1, wherein in response to partial evaluation and reduction of the predicate, the result is one of a logical condition TRUE, a logical condition FALSE and a reduced predicate, wherein the logical condition TRUE results in the critical point ranges being qualified critical point ranges, the logical condition FALSE results in the critical point ranges failing to qualify the critical point ranges, and the reduced predicate is one of further reduced and evaluated, and the critical point ranges are designated as qualified critical point ranges.

6. The method according to claim 1, wherein the matching further comprises applying the reduced predicate of the matching qualified critical point range to the qualified data partition matched by a single qualified critical point range; and applying a reduction on the predicate of the query on the range of the qualified data partition matched by multiple qualified critical point ranges to generate a reduced predicate of the qualified data partition.

7. The method according to claim 5, wherein, on a qualified data partition-by-qualified data partition basis, in response to the logical condition TRUE, fetch data from the storage system, and otherwise classify the reduced predicate into one of a push down sub-predicate and non-push down sub-predicate based on the storage system capabilities.

8. The method according to claim 7, further comprising processing the non-push down sub-predicate by the data processing, and pushing down the push down sub-predicate for processing at the storage system.

9. The method according to claim 8, further comprising recursively push the logical NOT operator through the logical AND/OR operator of an expression tree representative of the reduced predicate by application of De Morgan's Law, and apply rules of classification after a transformation of the expression tree.

10. One or more non-transitory computer storage mediums having computer-executable instructions embodied thereon that, when executed, facilitate a method of optimizing a query in a data processing system including one or more client computer systems and one or more server systems communicatively coupled to a network, the method comprising:

pruning a predicate of the query comprising determining one or more critical points of the predicate, each of the one or more critical points associated with critical point ranges, identifying the one or more critical points based on at least one logical operator and determining whether two or more of the critical points of the predicate are equivalent, wherein the one or more critical points are adjacent, and when the two or more critical points are equivalent, categorizing the two or more critical points into one of three categories and generating critical point ranges between the one or more critical points for each of the three categories, merging the categorized two or more critical points based on a set of merge rules and generating the critical point ranges for each of the three categories after merging, evaluating the predicate to qualify the critical point ranges for a sorted sequence of critical points, reducing the predicate based on the qualified critical point ranges to generate a reduced predicate, and matching the qualified critical point ranges to partition ranges in the data processing system to determine qualified data partitions; and pushing down the reduced predicate on a qualified data-partition-by-data-partition basis comprising classifying the reduced predicate into one of a push down sub-predicate and non-push down sub-predicate in response to the reduced predicate, and pushing down the push down sub-predicate to a storage system for processing, and executing the non-push down sub-predicate by the data processing system.

11. The non-transitory computer storage medium according to claim 10, wherein the at least one logical operator comprises one of SMALLER, SMALLER OR EQUAL, GREATER, GREATER OR EQUAL and NOT EQUAL;

further comprising:

in response to determining that the two or more critical points fail to be equivalent, generating a critical point range for each of the two or more critical points.

12. The non-transitory computer storage medium according to claim 11, wherein the three categories respectively include the operators: SMALLER or GREATER OR EQUAL, GREATER or SMALLER OR EQUAL, and EQUAL or NOT EQUAL.

13. The non-transitory computer storage medium according to claim 12, further comprising
sorting the identified one or more critical points; and
applying critical point range generation rules to the generated critical points based on a sorted sequence of one or more critical points and one or more corresponding categories.

14. The non-transitory computer storage medium according to claim 10, wherein in response to partial evaluation and reduction of the predicate, the result is one of a logical condition TRUE, a logical condition FALSE and reduced predicate, wherein
the logical condition TRUE results in the critical point ranges being qualified critical point ranges,
the logical condition FALSE results in the critical point ranges failing to qualify the critical point ranges, and
the reduced predicate is one of further reduced and evaluated, and the critical point ranges are designated as qualified critical point ranges.

15. The non-transitory computer storage medium according to claim 10, wherein the matching further comprises
applying the reduced predicate of the matching qualified critical point range to the qualified data partition matched by a single qualified critical point range; and
applying a reduction on the predicate of the query on the range of the qualified data partition matched by multiple qualified critical point ranges to generate a reduced predicate of the qualified data partition.

16. The non-transitory computer storage medium according to claim 14, wherein, on a qualified data partition-by-qualified data partition basis,
in response to the logical condition TRUE, fetch data from the storage system, and
otherwise classify the reduced predicate into one of a push down sub-predicate and non-push down sub-predicate based on the storage system capabilities.

17. The non-transitory computer storage medium according to claim 16, further comprising
processing the non-push down sub-predicate by the data processing, and
pushing down the push down sub-predicate for processing at the data system.

18. The non-transitory computer storage medium according to claim 17, further comprising recursively push the logical NOT operator through the logical AND/OR operator of an expression tree representative of the reduced predicate by application of De Morgan's, Law, and apply rules of classification after a transformation of the expression tree.

19. An apparatus to optimize query processing in a data processing system, the apparatus comprising:
a data source to store data for processing; and
a processing engine configured to
determine, in response to the query, one or more critical points of a predicate based on one or more attributes of data stored in a storage system of the data processing system, and generating critical point ranges for each of the one or more critical points;
identify the one or more critical points based on at least one logical operator and determining whether two or more of the critical points of the predicate are equivalent, wherein the one or more critical points are adjacent, and
when the two or more critical points fail to be equivalent, generating the critical point ranges for each of the two or more critical points, and
when the two or more critical points are equivalent, categorizing the two or more critical points into one of three categories and generating critical point ranges between the one or more critical points for each of the three categories, merging the categorized two or more critical points based on a set of merge rules, and generating the critical point ranges for each of the three categories after merging;
evaluate the predicate to qualify the critical point ranges for a sorted sequence of critical points, and applying a reduction on the predicate based on the critical point ranges to qualify the critical point ranges and to generate a reduced predicate;
compare the qualified critical point ranges generated from the predicate with sorted partition ranges of the data stored in the storage system of the data processing system, and marching the qualified critical point ranges to determine qualified-data partitions, and
process the reduced predicate against the data in the qualified data partitions to obtain query results.

20. The apparatus according to claim 19, wherein for each qualified data partition having a reduced predicate, the processing engine is further configured to push down the reduced predicate to the data system.

* * * * *